United States Patent [19]

Leger

[11] Patent Number: 5,572,938
[45] Date of Patent: Nov. 12, 1996

[54] OXYGEN LANCING FOR PRODUCTION OF CEMENT CLINKER

[75] Inventor: Christopher B. Leger, White Plains, N.Y.

[73] Assignee: Praxair Technology, Inc., Danbury, Conn.

[21] Appl. No.: 387,542

[22] Filed: Feb. 13, 1995

[51] Int. Cl.⁶ .................. F23B 7/00; F23B 14/00
[52] U.S. Cl. .................. 110/346; 110/342; 110/226; 110/246; 432/111; 432/118
[58] Field of Search .................. 110/226, 246, 110/346, 347, 348; 432/108, 111, 117, 118; 106/739, 740, 743, 760, 770

[56] References Cited

U.S. PATENT DOCUMENTS

| | | | |
|---|---|---|---|
| 3,302,938 | 2/1967 | Bendy | 106/740 X |
| 3,404,199 | 10/1968 | Hoffmann | 432/111 |
| 4,741,694 | 5/1988 | Mason et al. | 432/111 X |
| 4,934,931 | 6/1990 | Angelo, II | 110/246 X |
| 5,372,458 | 12/1994 | Flemmer et al. | 110/246 X |
| 5,377,603 | 1/1995 | Reese et al. | 110/226 X |

Primary Examiner—Henry A. Bennett
Assistant Examiner—Susanne C. Tinker
Attorney, Agent, or Firm—Stanley Ktorides

[57] ABSTRACT

Oxygen is lanced into the main combustion reaction of a cement kiln to increase heat transfer to the clinker bed and to increase clinker production. Oxygen is separately lanced along the floor, i.e. the lowest wall of the kiln, to delay mixing with the flame to provide deep staging. The deeply staged oxygen flow is adjusted frequently to control emissions and stabilize the burning zone while the primary oxygen flow is maintained constant.

12 Claims, 1 Drawing Sheet

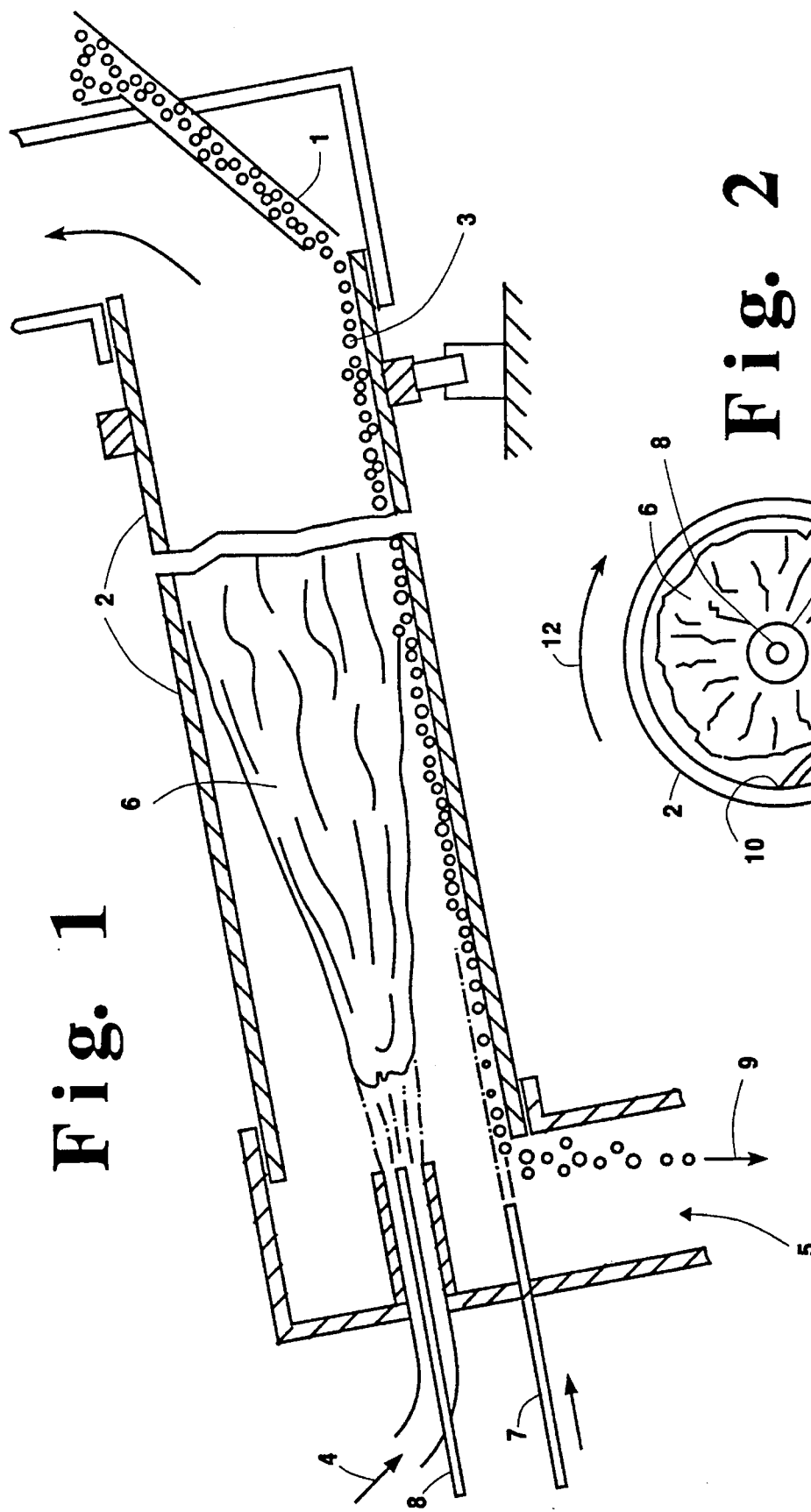
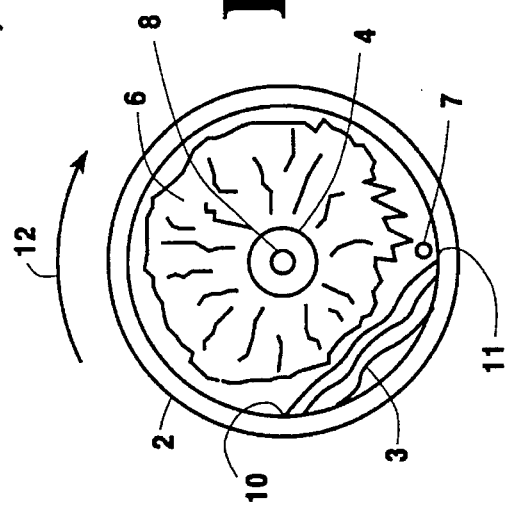

OXYGEN LANCING FOR PRODUCTION OF CEMENT CLINKER

TECHNICAL FIELD

This invention relates generally to rotary kiln practice and more specifically to the production of cement clinker used for the production of portland cement.

BACKGROUND ART

Portland cement is made by mixing and reacting raw materials in a high temperature rotary kiln. The raw materials, i.e. clinker precursor material, is typically composed of a mixture containing predominantly limestone and shale. The pulverized material may be supplied to the kiln either in a dry form (dry process) or as a slurry with water (wet process). The composition of the clinker precursor material is carefully controlled to ensure the proper proportions of the desired minerals, namely $CaCO_3$ (calcium carbonate), $SiO_2$ (silica), $Al_2O_3$ (alumina), $Fe_2O_3$ (iron oxide), and $MgCO_3$ (magnesium carbonate). Upon entry into the furnace system, the clinker precursor material first undergoes a drying and heating process. Next, the material undergoes calcination in which the carbonate minerals are converted to oxide minerals through the evolution of $CO_2$ (carbon dioxide). At still higher temperatures, the minerals chemically react with each other to produce primarily calcium silicates and calcium aluminates. This process is called clinkering, and it occurs in the burning zone of the rotary kiln. The resulting clinker is then cooled and pulverized and mixed with additional ingredients to form portland cement.

There are several different types of cement plants, including wet process rotary kilns, long dry process rotary kilns, preheater kilns, and precalciner kilns. The difference between these systems is primarily in the method used to dry, preheat and calcine the clinker precursor material. In all of these systems the process of forming clinker is accomplished in the same way, using a counterflow rotary kiln with direct firing in the burning zone.

It is known that the clinker production rate may be increased by injecting oxygen into the rotary kiln to improve the main combustion reaction which is typically an air-fuel flame. However, due to the highly variable operating conditions which characterize cement kiln practice, fuel-rich conditions or undesirable excess oxygen conditions are difficult to avoid. The unsteady state operating conditions of a cement kiln which may cause significant changes in the oxidant demand are due to many factors such as changes in the solids throughput, fuel flow rate, induced draft fan performance, or pressure drop through the system.

It is important in the operation of a cement kiln to maintain oxidizing conditions in the kiln because excess fuel or reducing conditions will cause inefficient kiln operation thus reducing the clinker production rate. Moreover, reducing conditions around the clinker will increase the release of sulfur dioxide from the clinker and may lessen the clinker quality. In addition to causing increased emissions of sulfur dioxide, insufficient oxygen can also cause emissions of carbon monoxide and unburned hydrocarbons. Conversely, if too much excess oxygen is present in the kiln, fuel efficiency is compromised, nitrogen oxides ($NO_x$) emissions may become a problem, and any added enrichment oxygen is only being wasted.

One way to deal with fluctuating oxidant demand is to adjust the flow of the oxygen which mixes with the main combustion reaction in concert with the fluctuating oxidant demand. However, such oxygen flow changes will cause changes in the flame characteristics, such as flame shape, intensity, stability and length of the flame of the main combustion reaction. Such changes in the main combustion reaction flame characteristics reduce the stability of the burning zone which leads to increased difficulty in controlling the main combustion reaction. Moreover such changes cause refractory coating within the kiln to build up in new places and fall off in others. The repeated building and shedding of refractory coating causes the refractory brick to wear down quicker than if the main combustion reaction were more constant, resulting in higher maintenance costs.

The problems caused by adjusting the flowrate of the oxygen which intermixes with the main combustion reaction may be avoided by maintaining such flowrate constant. However, the fluctuations of oxygen demand in the kiln lead to situations where there is either too little or too much oxygen. Too little oxygen leads to emissions problems and poor quality clinker. Too much oxygen may cause elevated $NO_x$ emissions and is expensive because oxygen is wasted. The high oxygen cost due to wasted excess oxygen has been a significant factor in keeping the use of oxygen from becoming widespread in the cement industry.

Accordingly it is an object of this invention to provide a method for producing clinker which can advantageously employ oxygen to produce high quality clinker at a high production rate.

It is another object of this invention to provide a method for producing clinker which can effectively avoid excess emissions caused by reducing conditions while maintaining relatively constant flame characteristics of the main combustion reaction.

It is a further object of this invention to provide a method for producing clinker which can produce good quality clinker at a high production rate without incurring excessive maintenance costs or high emission levels.

SUMMARY OF THE INVENTION

The above and other objects, which will become apparent to those skilled in the art upon a reading of this disclosure, are attained by the present invention, which is:

A method for producing clinker comprising:

(A) providing clinker material into a rotary kiln, rotating the kiln, and forming a bed comprising clinker material within the kiln, said bed having a high side and a low side due to the rotating action of the kiln;

(B) combusting fuel and main oxidant within the kiln in a main combustion reaction to provide heat for converting clinker material to clinker within the kiln;

(C) lancing primary oxygen into the kiln at a flowrate which is maintained substantially constant for at least a portion of the time that the main combustion reaction is occurring, and intermixing the primary oxygen with the main combustion reaction;

(D) lancing secondary oxygen into the kiln separately from the primary oxygen at a flowrate which is adjusted one or more times during the time that the flowrate of the primary oxygen is maintained substantially constant, and passing the secondary oxygen along the low side of the bed; and (E) recovering clinker from the kiln.

As used herein the term "oxygen" means a fluid having an oxygen concentration which equals or exceeds 22 mole percent. Preferably the oxygen is in the form of a fluid having an oxygen concentration which equals or exceeds 30 percent.

As used herein the term "lancing" means injecting oxygen into a vessel such as a kiln.

As used herein the term "kiln" means a cylindrical furnace that is tilted and rotates on its longitudinal axis to move solids along its axis and which is fired with a fuel/oxidant flame in a countercurrent configuration.

As used herein the term "clinker material" means material which reacts in a kiln to form clinker.

As used herein the term "oxidizing conditions" means conditions in the gas phase in the kiln where there is sufficient oxidant to complete the oxidation conditions to the desired degree. Generally this occurs when excess oxygen levels in the kiln exhaust are greater than 1 or 2 volume percent.

As used herein the term "excess oxygen" means the amount of oxygen measured in the flue gas after the combustion reactions are completed when describing the overall system and, when describing localized reactions, means an amount of oxygen expressed as percent of the product gases that will remain after the oxidation reactions in the local area are completed.

As used herein the term "reducing conditions" means conditions in which insufficient oxygen is present to complete the oxidation reactions, either locally or for the entire furnace, to the desired extent.

As used herein the term "bed" means an aggregate of solid particles within a vessel such as a rotary kiln.

As used herein the term "incompletely combusted fuel" means unoxidized species such as carbon or methane, and/or partially oxidized species such as carbon monoxide.

BRIEF DESCRIPTION OF THE DRAWINGS

FIG. 1 is a cross-sectional longitudinal representation of one preferred embodiment of the invention.

FIG. 2 is a cross-sectional radial representation of the embodiment of the invention illustrated in FIG. 1.

DETAILED DESCRIPTION

The invention will be described in detail with reference to the drawings. Referring now to FIGS. 1 and 2, clinker material 1 is provided into rotary kiln 2 and forms a bed 3 within rotary kiln 2. The kiln used in the practice of this invention is disposed at an angle with an elevated point at the clinker material input and a lower point at the clinker removal site. In this way the passage of clinker material through the kiln is facilitated. As rotary kiln 2 rotates the bed 3 is caused to rotate and to form a high side 10 on the bed side in the direction of rotation 12 and a low side 11 on the other side of the bed away from the direction of rotation.

Fuel 4 and main oxidant 5 are provided into kiln 2, either separately, as illustrated in FIG. 1, or together such as through a premixed or post-mixed burner or some combination of the two. Preferably the fuel and main oxidant are provided into the kiln at the end opposite the end at which the clinker material is provided into the kiln, and the resulting main combustion reaction passes through the kiln countercurrent to the direction the bed of clinker material is passing through the kiln.

The fuel may be any suitable fuel such as, for example, pulverized coal, pulverized petroleum coke, fuel oil, kerosene, waste solvents, or natural gas. The main oxidant may be any suitable oxidant. Air is the preferred main oxidant.

The fuel and main oxidant combust within the kiln and form a main combustion reaction 6 which generates heat within the kiln. The heat passes to the clinker material within bed 3 and causes the clinker material to react and form clinker within bed 3.

Primary oxygen 8 is lanced into kiln 2 through one or more lances, i.e. oxygen injectors, and intermixes with the main combustion reaction to combust with the fuel and to control the flame characteristics, e.g. flame shape, intensity, stability and/or length, of the main combustion reaction. The primary oxygen may be supplied by one or more oxygen injectors within the fuel supply, surrounding the fuel supply, impinging upon the fuel stream, or any other configuration which promotes intimate contact and mixing between the fuel and the primary oxygen. Once the desired flame characteristics of the main combustion reaction are attained, the flowrate of the primary oxygen being lanced into the kiln is preferably kept constant to maintain these desired flame characteristics. Generally the primary oxygen will be lanced into the kiln at a flowrate between 0.01 and 2.0 tons of oxygen per ton of coal being fired or its equivalent, with a preferred range between 0.01 and 0.6 tons of oxygen per ton of coal. The primary oxygen preferably is a fluid having an oxygen concentration of at least 30 mole percent and may be technically pure oxygen which has an oxygen concentration of at least 99.5 mole percent.

Secondary oxygen 7 is lanced into the kiln separately from the primary oxygen through one or more lances at a location between bed 3 and main combustion reaction 6 and also along the floor of the kiln as it rotates. Generally the secondary oxygen will be lanced into the kiln at a flowrate between 0.01 and 1.5 tons of oxygen per ton of coal being fired or its equivalent, with a preferred range between 0.01 and 0.6 tons of oxygen per ton of coal. The secondary oxygen preferably is a fluid having an oxygen concentration of at least 30 mole percent and may be technically pure oxygen which has an oxygen concentration of at least 99.5 mole percent. The secondary oxygen is passed along the low side 11 of clinker bed 3 between bed 3 and the main combustion reaction 6. The secondary oxygen maintains this orientation because it is denser than the main oxidant owing to its cooler temperature, which is generally ambient temperature, when it is lanced into the kiln and also because it passes between the low side of the clinker bed and the kiln floor surface which is the lowest wall of the kiln as it rotates. In this way the secondary oxygen maintains oxidizing conditions in the vicinity of bed 3 thus ensuring high clinker quality and not allowing excessive levels of sulfur dioxide to form from within the bed. After passage through a portion of the kiln length, generally from about 3 to 5 kiln diameters, this lanced secondary oxygen reacts with incompletely combusted fuel from the main combustion reaction to complete the combustion in a deeply staged manner so as to improve fuel efficiency and increase clinker production and reduce emissions of carbon monoxide, hydrocarbons and sulfur dioxide The secondary oxygen combustion is delayed in the deeply staged manner because of its flow along the kiln floor surface away from the main combustion reaction.

When there is a transient high oxidant demand in the kiln, the flowrate of the primary oxygen being lanced into the kiln need not change. Rather the transient high oxidant demand is addressed by adjusting, i.e. changing by increasing, the flowrate of the secondary or deeply staged oxygen being lanced into the kiln. In this way reducing conditions, which might cause production of sulfur dioxide, carbon monoxide and hydrocarbon emissions are avoided, and changes in the flame characteristics of the main combustion reaction, which lead to increased maintenance costs, are also avoided. Complete combustion of the fuel is enhanced, thus improving the clinker production rate. Similarly, if excess oxygen levels in the kiln exhaust gas are too high, the flow rate of the secondary oxygen may be i.e. reduced, to avoid wasting oxygen and to prevent high NOx emissions without changing the flame characteristics of the main combustion reaction.

The clinker is removed, i.e. recovered, from kiln 2 as shown by 9 and passed on for further processing for the manufacture of cement. Generally the clinker will comprise one or more of the following: tricalcium silicate ($3CaO \cdot SiO_2$), dicalcium silicate ($2CaO \cdot SiO_2$), tricalcium aluminate ($3CaO \cdot Al_2O_3$), and tetracalcium aluminoferrite ($4CaO \cdot Al_2O_3 \cdot Fe_2O_3$).

Although the invention has been described in detail with reference to certain preferred embodiments, those skilled in the art will recognize that there are other embodiments of the invention within the spirit and the scope of the claims.

Moreover, although the invention has been described with reference to the operation of a cement kiln, it is anticipated that the invention will also find utility in the operation of any directly fired rotary kiln wherein solid aggregate material forms a bed which is heat treated in some way with heat from a combustion reaction above the bed. Some examples of such other kiln processes are lime kiln practice wherein limestone is converted to lime, ore heating/calcining kiln practice, solids drying kiln practice, wherein water is removed from the material, and incinerator kiln practice. Some specific examples are: the production of barium sulfide by calcining a mixture of barite and carbon; the production of lithium aluminum silicate by calcining a mixture of quartz, feldspar and spodumene; the production of vermiculite by roasting micaseous material; the production of titanium dioxide by heating a mixture of ore and carbon; the production of alumina by calcining bauxite or aluminum hydroxide; the calcining of phosphate ore; the recovery of mercury from cinnabar ores; the production of plaster of paris by heating gypsum; and the reduction of iron ores. A rigorous definition of the more generalized practice of the invention is as follows:

A method for processing solid aggregate material comprising:

(A) providing solid aggregate material into a rotary kiln, rotating the kiln, and forming a bed comprising solid aggregate material within the kiln, said bed having a high side and a low side due to the rotating action of the kiln;

(B) combusting fuel and main oxidant within the kiln in a main combustion reaction to provide heat for processing solid aggregate material within the kiln;

(C) lancing primary oxygen into the kiln at a flowrate which is maintained substantially constant for at least a portion of the time that the main combustion reaction is occurring, and intermixing the primary oxygen with the main combustion reaction;

(D) lancing secondary oxygen into the kiln separately from the primary oxygen at a flowrate which is adjusted one or more times during the time that the flowrate of the primary oxygen is maintained substantially constant, and passing the secondary oxygen along the low side of the bed; and (E) recovering processed aggregate material from the kiln.

I claim:

1. A method for producing clinker comprising:

(A) providing clinker material into a rotary kiln, rotating the kiln, and forming a bed comprising clinker material within the kiln, said bed having a high side and a low side due to the rotating action of the kiln;

(B) combusting fuel and main oxidant within the kiln in a main combustion reaction to provide heat for converting clinker material to clinker within the kiln;

(C) lancing primary oxygen into the kiln at a flowrate which is maintained substantially constant for at least a portion of the time that the main combustion reaction is occurring, and intermixing the primary oxygen with the main combustion reaction;

(D) lancing secondary oxygen into the kiln separately from the primary oxygen at a flowrate which is adjusted one or more times during the time that the flowrate of the primary oxygen is maintained substantially constant, and passing the secondary oxygen along the low side of the bed; and (E) recovering clinker from the kiln.

2. The method of claim 1 wherein the main combustion reaction produces incompletely combusted fuel, further comprising combusting at least some of the incompletely combusted fuel with at least some of the secondary oxygen within the kiln after the secondary oxygen has flowed along a portion of the kiln floor surface.

3. The method of claim 1 wherein the clinker material comprises at least one compound from the group consisting of calcium carbonate, silica, alumina, iron oxide and magnesium carbonate.

4. The method of claim 1 wherein the clinker comprises a calcium silicate.

5. The method of claim 1 wherein the clinker comprises a calcium aluminate.

6. A method for processing solid aggregate material comprising:

(A) providing solid aggregate material into a rotary kiln, rotating the kiln, and forming a bed comprising solid aggregate material within the kiln, said bed having a high side and a low side due to the rotating action of the kiln;

(B) combusting fuel and main oxidant within the kiln in a main combustion reaction to provide heat for processing solid aggregate material within the kiln;

(C) lancing primary oxygen into the kiln at a flowrate which is maintained substantially constant for at least a portion of the time that the main combustion reaction is occurring, and intermixing the primary oxygen with the main combustion reaction;

(D) lancing secondary oxygen into the kiln separately from the primary oxygen at a flowrate which is adjusted one or more times during the time the flowrate of the primary oxygen is maintained substantially constant, and passing the secondary oxygen along the low side of the bed; and (E) recovering processed aggregate material from the kiln.

7. The method of claim 6 wherein the main combustion reaction produces incompletely combusted fuel, further comprising combusting at least some of the incompletely combusted fuel with at least some of the secondary oxygen within the kiln after the secondary oxygen has flowed along a portion of the kiln floor surface.

8. The method of claim 6 wherein the solid aggregate material comprises limestone.

9. The method of claim 6 wherein the solid aggregate material comprises metal ore.

10. The method of claim 6 wherein the solid aggregate material comprises waste.

11. The method of claim 6 wherein the processing of the solid aggregate material within the kiln comprises drying.

12. The method of claim 6 wherein the solid aggregate material comprises a mineral.

* * * * *